(12) United States Patent
Franceschini et al.

(10) Patent No.: US 8,938,249 B2
(45) Date of Patent: Jan. 20, 2015

(54) METHOD AND SYSTEM FOR CONTROLLING ADMISSION IN MOBILE COMMUNICATION NETWORKS, RELATED NETWORK AND COMPUTER PROGRAM PRODUCT THEREFOR

(75) Inventors: Daniele Franceschini, Turin (IT); Nicola Pio Magnani, Turin (IT)

(73) Assignee: Telecom Italia S.p.A., Milan (IT)

( * ) Notice: Subject to any disclaimer, the term of this patent is extended or adjusted under 35 U.S.C. 154(b) by 2400 days.

(21) Appl. No.: 11/658,845

(22) PCT Filed: Jul. 29, 2004

(86) PCT No.: PCT/EP2004/008522
§ 371 (c)(1),
(2), (4) Date: Jan. 29, 2007

(87) PCT Pub. No.: WO2006/010380
PCT Pub. Date: Feb. 2, 2006

(65) Prior Publication Data
US 2008/0318590 A1     Dec. 25, 2008

(51) Int. Cl.
*H04W 72/00*     (2009.01)
*H04W 16/06*     (2009.01)
(Continued)

(52) U.S. Cl.
CPC .......... *H04W 16/06* (2013.01); *H04W 72/0486* (2013.01); *H04W 28/08* (2013.01); *H04W 28/00* (2013.01)
USPC ...................................................... 455/453

(58) Field of Classification Search
CPC . H04W 16/06; H04W 72/0486; H04W 28/08; H04W 28/00

USPC .................................................. 455/450–453
See application file for complete search history.

(56) References Cited

U.S. PATENT DOCUMENTS 5,497,504 A * 3/1996 Acampora et al. ............ 455/436
5,671,218 A   9/1997 I et al.
(Continued)

FOREIGN PATENT DOCUMENTS

EP    1 227 695 A1    7/2002
EP    1 326 465 A1    7/2003
(Continued)

OTHER PUBLICATIONS

"Uplink & Downlink Traffic Capacity Performance in a WCDMA Systems," L Mendo & JM Hernando, Wireless Design Conference (WDC 2002), London, UK, May 2002.*
(Continued)

*Primary Examiner* — Dwayne Bost
*Assistant Examiner* — Larry Sternbane
(74) *Attorney, Agent, or Firm* — Finnegan, Henderson, Farabow, Garrett & Dunner, L.L.P.

(57) ABSTRACT

A method for controlling admission of calls to a mobile communication network having cells associated with at least one determined threshold level of operation suitable for managing cell shrinking phenomena. The method includes the operation of detecting call requests from a cell edge affected by such cell shrinking phenomena, variably exceeding the determined threshold level in uplink. A method for admitting calls to the mobile communication network in both uplink and downlink on the basis of the evaluation of the actual system load is also proposed. Preferred application is in UMTS mobile networks.

36 Claims, 1 Drawing Sheet

(51) Int. Cl.
  *H04W 72/04* (2009.01)
  *H04W 28/08* (2009.01)
  *H04W 28/00* (2009.01)

(56) References Cited

U.S. PATENT DOCUMENTS

| | | | | |
|---|---|---|---|---|
| 6,075,815 | A | * | 6/2000 | Chheda et al. ............... 375/227 |
| 6,253,087 | B1 | | 6/2001 | Corbett |
| 6,400,954 | B1 | * | 6/2002 | Khan et al. .................. 455/450 |
| 6,631,269 | B1 | * | 10/2003 | Cave ............................ 455/450 |
| 6,801,515 | B1 | * | 10/2004 | Ishikawa et al. ............. 370/342 |
| 7,024,203 | B1 | * | 4/2006 | Naghian ...................... 455/453 |
| 2002/0102984 | A1 | * | 8/2002 | Furuskar et al. ............. 455/452 |
| 2004/0242235 | A1 | * | 12/2004 | Witana ....................... 455/452.2 |

FOREIGN PATENT DOCUMENTS

| | | | | |
|---|---|---|---|---|
| EP | 1326465 | A1 | * 7/2003 | ............... H04Q 7/38 |
| EP | 1 339 251 | A2 | 8/2003 | |
| EP | 1339251 | A2 | * 8/2003 | ............... H04Q 7/38 |

OTHER PUBLICATIONS

Laakso, J. et al., "Radio Resource Management," WCDMA for UMTS, John Wiley & Sons, Ltd, Holms et al., ed., Chapter 9, pp. 183-215, (2001).

* cited by examiner

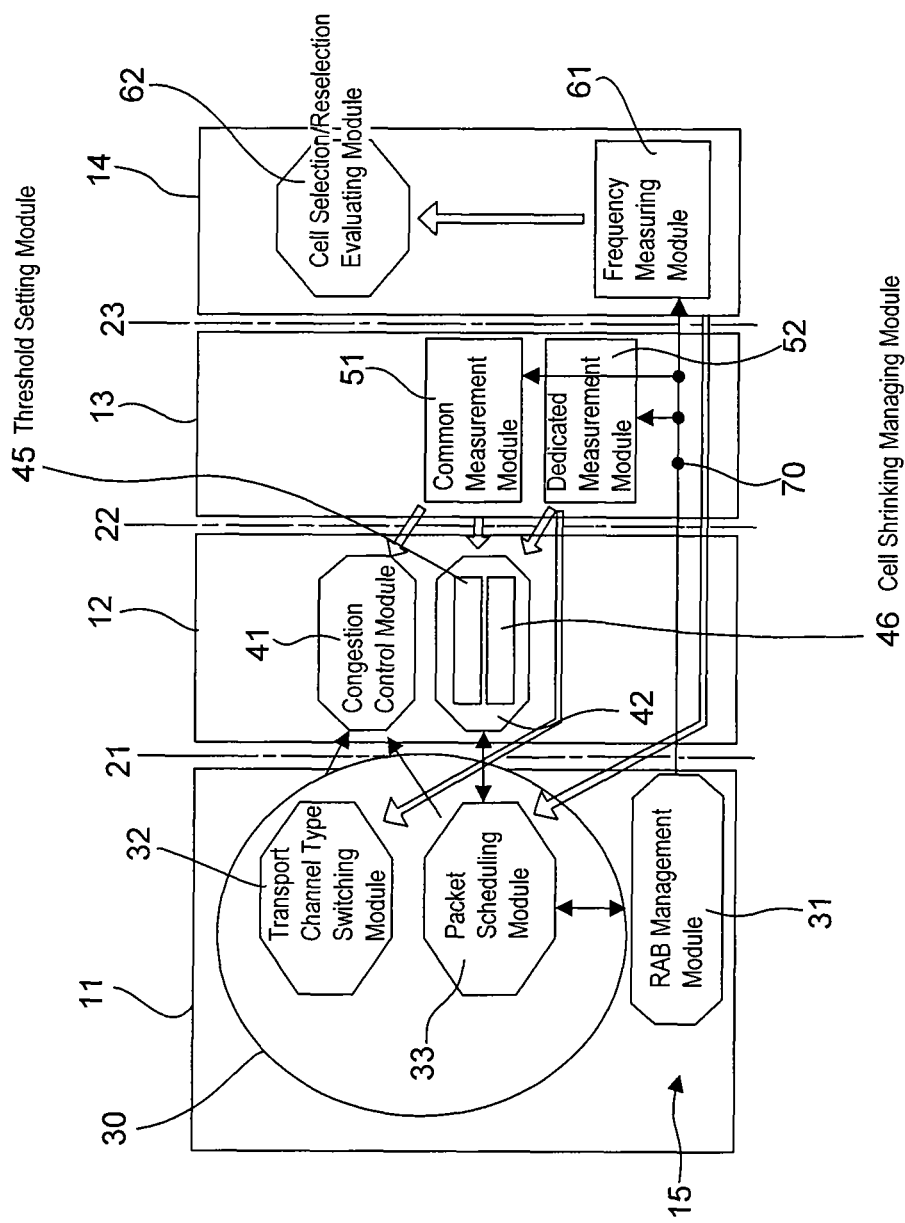

METHOD AND SYSTEM FOR CONTROLLING ADMISSION IN MOBILE COMMUNICATION NETWORKS, RELATED NETWORK AND COMPUTER PROGRAM PRODUCT THEREFOR

CROSS REFERENCE TO RELATED APPLICATION

This application is a national phase application based on PCT/EP2004/008522, filed Jul. 29, 2004, the content of which is incorporated herein by reference.

FIELD OF THE INVENTION

The present invention relates to techniques for admission control in Radio Resources Management (RRM) procedures as implemented in CDMA type systems, such as e.g. a mobile network based on a CDMA (Code Division Multiple Access) radio interface.

DESCRIPTION OF THE RELATED ART

The use of admission control procedures is typical of mobile networks devised as spread spectrum systems, i.e. CDMA (Code Division Multiple Access) and WCDMA (Wide-Band CDMA) mobile networks.

In a CDMA mobile radio access network (in the following referred to as 'system'), e.g. UTRAN (Universal Terrestrial Radio Access Network), each new call increases the interference level of all other ongoing calls, thus affecting their quality. It is very important therefore to control that the network is accessed in a controlled way: this is the objective of Admission Control procedures.

Admission control procedures are acting on cell basis and are usually considered to represent a part of Radio Resource Management procedures, i.e. that set of procedures implemented in mobile networks in equipment in which the specific radio protocols are terminated. Admission Control procedures, like any other Radio Resource Management procedure, are outside the scope of standardization fora such as e.g. 3GPP (Third Generation Partnership Project).

Admission Control procedures are thus implementation-dependent. In other words, the adoption of different RRM procedures lead to different performance levels thus representing one of the differentiating factors among the products offered by different vendors for what concerns the efficiency of the network.

Admission control procedures, as discussed in reference textbooks such as 'WCDMA for UMTS' (see Chapter 9), edited by H. Holma & A. Toskala, 2000, John Wiley, provide for the use of admission thresholds, e.g. in radio network controllers of the system, that are based on, associated with, or a function of the maximum received interference or the maximum number of active users. The system load, expressed in terms of received interference or number of active users, is compared against such admission thresholds, that are set a priori during the design or planning phase of the network, in order to determine whether a new call can be accepted or not. In the above mentioned book, only fixed admission thresholds are used and, therefore, the system capacity is not necessarily optimised based on the actual network conditions. In fact, Applicant believes that there may be the case in which an additional call can be accepted by the network even if this implies the trespassing of the determined admission threshold in uplink (i.e., connection from user equipment to base station).

With specific reference to the connection on the uplink, a maximum threshold is set in order to prevent the rise of network instability, i.e., avoid that all mobile terminals registered in a cell transmit at their maximum power, which would result in the base station being unable of decoding any signal, because of the excessive noise rise. The maximum threshold used for admission control is usually set by the operator in the network design phase in order to ensure network stability as well as a good tradeoff between capacity and coverage of the network.

As known, in CDMA networks coverage and capacity are indeed closely related: when cell carried traffic, i.e. load, increases, the cell coverage area shrinks leading to coverage holes at the cell edge (i.e., as known to a skilled in the art, the electromagnetic boundaries of the cell, beyond which it the cell can not provide service). Such a phenomenon is called 'cell breathing' or 'cell shrinking'. In particular, if the cell load exceeds the originally foreseen values (that are used in the planning phase to set up the admission thresholds), coverage holes appear in the system leading to poor service. If new users and new calls are still accepted, network instability arises.

Admission control procedures should be able to prevent such phenomena, and therefore admission control procedures must aim to maximize system capacity while ensuring good coverage and network stability.

Moreover, systems like UTRAN provide a wide range of services, i.e. voice, data, and multimedia services.

From EP-A-1 227 695 and U.S. Pat. No. 5,671,218, admission control procedures in a multiservice environment are known. It is proposed in the above documents to assign different priorities to different services, i.e. different fixed admission thresholds, on the basis of required data rate and quality of service requirements. This approach suffers the same problem outlined above.

U.S. Pat. No. 6,253,087 addresses the above mentioned problem, i.e. how to handle additional calls even if the determined fixed admission threshold is overcome. The above document proposes to exploit other frequencies in order to prevent cell shrinking while ensuring access to the system; such a solution requires the availability of at least a second frequency.

Applicant believes that not necessarily a second frequency is available and therefore the proposed solution is not always viable.

Therefore Applicant believes that prior art does not disclose a method able to maximise capacity when network load reaches the maximum admission threshold(s) determined, for example, in the planning phase.

OBJECT AND SUMMARY OF THE INVENTION

The need therefore exists of providing an arrangement adapted to overcome the intrinsic drawbacks of the prior art considered in the foregoing. Specifically, the need is felt for an arrangement that allows for maximizing system capacity while ensuring the intended coverage.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

According to the present invention it is provided a method for maximising the uplink system capacity by admitting additional calls even if this implies exceeding uplink cell load thresholds set in the designing phase of the network.

In addition, according to the present invention, it is provided a complete architecture for admission control in Radio Resource Management (RRM) in a CMDA based mobile network such as a network operating according to the UMTS (Universal Mobile Telecommunications System) standard, including:

a method for automatically evaluating the actual system load by exploiting suitable measurements for both uplink and downlink;

a method for admitting or rejecting calls for both uplink and downlink.

In summary, the arrangement described herein proposes an integrated architecture for admission control procedures that sets admission thresholds for both uplink and downlink, evaluates the current system load by taking into account the current system conditions and maximizes system capacity by properly admitting new calls in the uplink even if this implies exceeding cell load thresholds set in the planning phase of the network, still ensuring network stability.

Preferably, current system conditions are evaluated in an iterative way by exploiting power measurements on the system.

In a preferred embodiment an architecture including two main modules is proposed: a first module configured for setting dynamically the admission thresholds for the different services based on current system conditions, expressed in particular in terms of available resources; a second module configured for managing the cell shrinking, maximizing carried traffic and preventing poor service conditions.

BRIEF DESCRIPTION OF THE ANNEXED DRAWINGS

The invention will now be described, by way of example only, by referring to the enclosed figures of drawing, wherein:

FIG. 1 is a schematic representation of a typical context of use of the arrangement described herein.

DETAILED DESCRIPTION OF PREFERRED EMBODIMENTS OF THE INVENTION

FIG. 1 shows a schematic view of architecture for radio resources management in a UMTS mobile communication network (not shown as a whole). The architecture comprises a serving radio network controller, or S-RNC according to the UMTS standard, indicated as whole by the reference 11.

Such a serving radio network controller 11 is interfaced through a first UTRAN interface 21 (the so-called Iur interface in the UMTS standard), with a controlling radio network controller 12, e.g. C-RNC according to the UMTS standard.

The controlling radio network controller 12 is in turn interfaced through a second UTRAN interface 22, the UMTS Iub interface, with a base station 13, corresponding to the Node B in the UMTS standard. Finally, the base station 13 communicates with an user equipment 14 through a third radio interface 23, called Uu interface in the UMTS standard.

The serving radio network controller 11 is a Radio Network Controller module equipped with a Radio Resource Control (RRC) connection with user equipment 14. The serving radio network controller 11 is responsible for the user mobility within the UTRAN network and is also the point of connection towards a Core Network 15.

The controlling radio network controller 12 is the Radio Network Controller module that is responsible for the configuration of a specific base station 13. User equipment 14 accessing the system will send an access message to a base station 13, which in turn will forward this message onto its respective controlling radio network controller 12.

The base station 13 within the UMTS network provides the physical radio link between the user equipment 14 and the network. While ensuring the transmission and reception of data across the radio interface, the base station 13 also applies the codes that are necessary to discriminate channels in a CDMA system.

The user equipment 14 represents the UMTS subscriber, i.e. substantially a combination of Mobile Equipment and SIM/USIM module (Subscriber Identity Module/UMTS Subscriber Identity Module).

The serving radio network controller 11 thus comprises, for instance, a RAB management module 31 and a packet management module 30; the packet management module 30 in turn includes a transport channel type switching module 32 and a packet scheduling module 33.

The controlling radio network controller 12 includes an admission control module 42 and a congestion control module 41.

The admission control module 42 according to one embodiment of present invention comprises two modules:

a threshold setting module 45, configured for setting dynamically the admission thresholds for the different services based on current system conditions, expressed in particular in terms of available resources;

a cell shrinking managing module 46, configured for managing the cell shrinking, maximizing carried traffic and preventing poor service conditions.

Such a threshold setting module 45, according to a preferred embodiment of present invention, implements a service priority procedure, better detailed in the following, that sets actual admission thresholds by taking into account the current cell load, both on the uplink and downlink. A PSH_U threshold parameter is there made available, that can be set by the operator for each different type of service and it can assume different values for different load conditions.

The threshold setting module 45 provides that a new call can be admitted only if the associated new service requires less resources (e.g., power resources) than a percentage of the remaining power resources, such a percentage being established through such a PSH_U threshold parameter. Such a procedure offers to the operator an additional degree of flexibility in managing admission control thresholds: it is in fact possible to set the thresholds to higher values, i.e., closer to the point where cell shrinking could possibly arise, while ensuring a full control of the system load.

The cell shrinking managing module 46, according to a preferred embodiment of present invention, maximizes the system capacity and the exploitation of radio resources while ensuring network stability by properly admitting new calls if system conditions allow them, even if this requires exceeding the cell load threshold set up by the operator in the uplink. Such an exceeding the cell load threshold is accompanied by proper actions in order to avoid both occurrence of coverage holes in areas where the service is guaranteed and system performance degradation.

The base station 13 further comprises a common measurements module 51, of known type, for operating on the common channels and a dedicated measurement module 52, of known type, for operating on the dedicated channels.

The user equipment 14 comprises a module 61 for measuring the "inter" frequency and the "intra" frequency radio signals and a module 62 for evaluating cell selection and cell reselection, all of known type.

FIG. 1 shows a generic link, indicated by the reference number 70, connecting the serving radio network controller 11 to the user equipment 14, through the controlling radio network controller 12 and the base station 13. The common measurement module 51 and the dedicated measurement module 52 measure the power on the different channels comprising the uplink and/or the downlink sections on the generic link 70.

In order to define the load and the congestion of the network a number of measurements are performed at the base station 13. This occurs by means of the common measurement module 51 and the dedicated measurement module 52.

According to the UMTS standard, the following measurement results are usually reported to the controlling radio network controller 12 through the first interface 21:
- a RTWP (Received Total Wideband Power) measure, defined as the wide band power, including noise generated in the receiver, received within the channel bandwidth;
- a UTRA carrier power measure UTRA_Carrier_Power, that is the total transmitted power in downlink on a single carrier.

In the arrangement described herein, the current cell load on the uplink is evaluated, according to a preferred embodiment of present invention, by means of an iterative procedure, as detailed in the following, based on (i) RWTP measurement and on (ii) an estimation of the load involved by a new call.

Such an estimation of the load increment involved by a new call is performed through a calculation using suitable analytical formulas, e.g. as known from literature. This allows for estimating the interference before taking the decision of actually admitting the new call. When such a new call is admitted, a working point value, corresponding to the actual cell load, is updated by means of an incremental measurement of the load associated to the last admitted call.

Similarly, in the arrangement described herein, in the downlink the actual cell load is assessed by means of the carrier power measurement UTRA_Carrier_Power performed at the base station 13 and reported to the controlling radio network controller 12: on the basis of such a measurement it is possible to refine the estimation of the load increment of a new call.

In the following the admission control procedure on the uplink, according to a preferred embodiment of present invention, will be detailed.

During normal operation, a new call is admitted on the uplink when the following two conditions are simultaneously verified:

$$\eta_{UL\_Working\_Point} + \Delta\eta_{UL} \leq \eta_{UL\_max} \quad (1)$$

$$\Delta\eta_{UL} \leq PSH\_U^*(\eta_{UL\_max} - \eta_{UL\_Working\_Point}) \quad (2)$$

where:
PSH_U indicates a threshold parameter, representative of a percentage of service hysteresis on the uplink, that can be set by the operator for each different type of service and that can assume different values for each load status;
$\eta_{UL\_Working\_Point}$ indicates the load at working point on the uplink;

$\Delta\eta_{UL}$ represents the load increment determined by a new call; and
$\eta_{UL\_max}$ represents the maximum load of the cell on the uplink.

According to expressions (1) and (2), thus, a new call on the uplink can be admitted only if the new service associated to such a new call requires a power that is less than the value represented by a percentage, indicated by the threshold parameter PSH_U, of the remaining resources, that correspond to the difference ($\eta_{UL\_max} - \eta_{UL\_Working\_Point}$). By observing expressions (1) and (2) is thus apparent that the admission thresholds, represented by the threshold parameter PSH_U, are effectively based on current system load.

In summary, according to one embodiment of present invention, based on the estimated load increment due to a new call, two quantities are checked for admitting the new call:
- the overall load; and
- the remaining resources.

In more detail, the working point estimation can be based on the following calculation criteria.

When a new call arrives, the working point load estimation $\eta_{UL\_Estimated}$ is set to:

$$\eta_{UL\_Estimated} = \eta_{UL\_Working\_point} + \Delta r_1 \quad (3)$$

If the new call is the first call to be admitted, $\eta_{UL\_Working\_Point}$ is set to zero (the Noise_Rise variable is set, as known to a skilled person, to one, since the network is not yet carrying traffic, and the RWTP measure is equal to a thermal noise power P_Thermal_Noise), and the working point estimation $\eta_{UL\_Estimated}$ is equal to the load increment $\Delta\eta_{UL}$ that is calculated according to the following expression of known type:

$$\Delta\eta_{UL} \cong R \cdot \frac{\nu \cdot (E_b/N_0)}{W} \cdot (1+f) \quad (4)$$

where:
$E_b/N_0$ is the ratio of average pilot symbol energy and noise density of each channel,
$\nu$ is the service activity factor;
R is the service bit rate, and
W is the channel bandwidth, and
f is the intercell to intracell interference ratio.

After this first phase, when a further new call arrives, the working point load $\eta_{Working\_point}$, that will be used for the next admission phase, is updated using the relation:

$$\eta_{UL\_Working\_Point} = (1 - P\_Thermal\_Noise/RWTP) \quad (5)$$

The load increment $\Delta\eta_{UL}$ for the new incoming call, as already mentioned, is calculated by using the expression (4).

The working point load estimation is then calculated, according to (3), as:

$$\eta_{UL\_Estimated} = (1 - P\_Thermal\_Noise/RWTP) + \Delta\eta_{UL} \quad (6)$$

In this way, every time a new call is admitted—since the decision must be taken before the call is admitted and it is not possible to directly measure the load increase due to such a new call—a proper estimation of the corresponding load increment is performed by means of the analytical formulas reported above.

When the call is admitted the working point load is updated by means of the measured load.

Such a working point update is carried out when a new admission request is accepted.

In the admission control procedure on the downlink, the following expression of known type can be used for example in order to estimate a power increment ΔP associated to a new call:

$$\Delta P = \frac{P\_Thermal\_Noise \left\{ \sum_{i=1}^{I} \frac{(E_b/N_0)_i \cdot R_i \cdot v_i}{W} \cdot L_{k,i} + \frac{(E_b/N_0)_{New} \cdot R_{New} \cdot v_{New}}{W} L_{k,New} \right]}{1 - \left\{ \eta_{DL} + \frac{(E_b/N_0)_{New} \cdot R_{New} \cdot v_{New}}{W} * [(1-\alpha)+f] \right\}} - \frac{P\_Thermal\_Noise \sum_{i=1}^{I} \frac{(E_b/N_0)_i \cdot R_i \cdot v_i}{W} \cdot L_{k,i}}{1 - \eta_{DL}}$$

(7)

where:
I is the number of users when the new call request arrives
W is the channel bandwidth;

$$\left(\frac{E_b}{N_0}\right)_i$$

is the energy per bit divided by the interference spectral density per user i;
α is the orthogonality factor;
$R_i$ is the service bit rate per user i;
f is the intercell to intracell interference ratio;
$v_i$ is the service activity factor per user i;
$L_{k,i}$ is the path loss in the cell K between the BTS transmitter and the i user receiver in the downlink. All the parameters marked with the subscript "new" refer to the values related to the new call that is evaluated to be admitted.

According to a methodology of known type the load $\eta_{DL}$ on the downlink can be defined as:

$$\eta_{DL} = \sum_{i=1}^{I} \frac{(E_b/N_0)_i \cdot R_i \cdot v_i}{W} \cdot [(1-\alpha)+f]$$

where the main parameters were already defined above. $\eta_{DL}$ represents the downlink load before the request of the that is evaluated by the network in order to be admitted.

The expression (7) can be used for each single radio access bearer (RAB) allocated on the downlink. By way of example, the power required by a 64 kbps circuit switched radio access bearer on the downlink is greater than the power required by a circuit switched radio access bearer at 12.2 kbps for voice.

Assuming the same condition in terms of average α and average f it is possible to calculate for each radio bearer on the downlink a PES (Power Equivalent Speech) parameter defined as the ratio of a power increment for the bearer ΔP_RAB to a power increment for speech ΔP_speech.

Thus, when a new call arrives, it is possible to calculate the total power used by a power amplifier of the base station 13 by looking at the carrier power measurement UTRA_Carrier_Power performed by the base station 13 and reported to the controlling radio network controller 12.

Since at the controlling radio network controller 12 it is available the information on the power dedicated to common channel Pcc measured in the common measurements module 51, it is possible to calculate the total power allocated to all the dedicated channels.

Since the controlling radio network controller 12 is further aware of a number S of the services that are set up in a certain cell in a certain time, and also is aware of the type of such services, it is possible to calculate through the following expression the average of the power increment for speech ΔP_speech. In particular:

$$\Delta P\_Speech = \frac{(UTRA\_Carrier\_Power - Pcc)}{\sum_{s=1}^{S} PES_S}$$

(8)

From the expression (8) it is possible to calculate the power increment for the radio bearer ΔP_RAB for each kind of radio bearer as ΔP_speech*PES. Thus, every time a new radio bearer is requested, the estimation of the power increment is performed in the way described.

During normal operation, a new call on the downlink is thus accepted if:

$$P_{DL} + \Delta P \leq P_{max}$$ (9)

and $$\Delta P \leq PSH\_D*(P_{max} - P_{DL})$$ (10)

where:
$P_{DL}$ indicates the measured power on the downlink and
$P_{max}$ a maximum power allowed on the downlink.
PSH_D indicates a threshold parameter, representative of a percentage of service hysteresis, for the downlink, that can be set by the operator for each different type of service and that can assume different values for each load status. According to the above reported relations, a call can be admitted only if the new service requires less than the percentage value indicated by the threshold parameter on the downlink PSH_D of the remaining resources, ($P_{max}-P_{DL}$).

In summary, according to one embodiment of present invention, based on the estimated power increment due to a new call, two quantities are checked for admitting the new call:
the overall transmitted power; and
the remaining available power.

Expressions (1), (2), (9), and (10) refer to maximum power, $\eta_{UL\_max}$ and $P_{max}$ for uplink and downlink respectively, thus such maximum powers $\eta_{UL\_max}$ and $P_{max}$ can be regarded as maximum thresholds.

With specific reference to the uplink, a maximum threshold is necessary, as already mentioned, in order to prevent network instability to arise, i.e., all mobile terminals transmitting at their maximum power and the base station 13 being unable to decode signals because of the excessive noise rise.

In addition, a threshold is also needed in order to avoid cell shrinking and subsequent coverage holes in areas where the service should be guaranteed. As indicated, this last-cited task is performed by the cell shrinking managing module 46.

Usually, small cells or microcells can sustain higher values for capacity threshold, since mobile terminals are close to the base station and therefore they can easily overcome path loss, being able to use all remaining power to stand noise rise due to high capacity, whereas wide macrocells in rural areas are usually designed with low capacity thresholds values, since most power is used to overcome path loss, thus there is not much power left to stand noise rise. In the latter case cell capacity is kept rather low in order to ensure wide coverage area.

However, especially in low traffic conditions typical of rural areas, it may happen that a call that is originated close to the base station is rejected by the admission control procedure in order to guarantee service coverage in an area where no call is in progress at that time. In fact the rejected call could have been accepted by the system even if this would have caused exceeding the planned threshold, without causing any degradation of the quality of service perceived by users, provided that enough power is available in the downlink, as per equation (9) and (10).

If, during this phase i) it is not possible to maintain a call already in progress due to the acceptance of previous call or ii) a call is originated in an area resulting out of coverage due to the acceptance of previous call, the cell shrinking managing module 46 provides for commanding proper actions that must be taken by the network in order to be able to accept the last call request, e.g., forced termination of lower priority calls in progress or forced termination of the last accepted call.

Such a procedure is possible if the base station 13 can detect the new call request on common RACH (Random Access Channel) channel in the uplink, i.e., if the required cell capacity is higher than the threshold set by the operator, but still allows correct RACH decoding, in addition to prevention of network instability.

Based on the above considerations, the proposed method provides, according to one embodiment of present invention, for the use of two maximum power thresholds on the uplink:

a first power threshold $\eta_{max\_pl}$ set by the operator in the network planning phase, and a second power threshold $\eta_{max\_RACH}$, higher than the first power threshold $\eta_{max\_pl}$, suitable for allowing correct RACH decoding from cell edge.

With reference to equations (1) and (2), $\eta_{UL\_max}$ can therefore be replaced by either $\eta_{max\_pl}$ or $\eta_{max\_RACH}$.

It must be noted that, by definition, such two maximum power thresholds $\eta_{max\_pl}$ and $\eta_{max\_RACH}$ ensure network stability in the sense defined in the foregoing. Module 46 provides that calls are admitted in the cell if this does not affect calls already in progress and even if the first maximum power threshold $\eta_{max\_pl}$, but not the second maximum power threshold $\eta_{max\_RACH}$, is exceeded.

If, in a condition in which the cell load exceeds the first power threshold $\eta_{max\_pl}$, a call request is received from an area where the service is guaranteed, but that is currently out of service coverage due to the acceptance of previous calls, the cell shrinking managing module 46 provides for commanding proper actions in order to be able to accept the last call request, e.g., forced termination of lower priority calls in progress or forced termination of the last accepted call.

The proposed method can make use, for example, of an information on the location of the mobile terminals 14 or other methods aiming to determine calls in areas where service coverage should be guaranteed.

According to the above embodiment the operator has the possibility to control the admission of a new call separately for each type of service, basing the admission decision on a set of criteria that can be differentiated as a function of the service itself and the load of the network. For this reason the operator can implement different strategies in the admission of the different services implemented in the network.

Moreover thanks to the above embodiment it is possible for the operator to better exploit spectrum resources enabling higher system capacity in uplink particularly for those services requiring small amount of resources (i.e., that are more likely to benefit from the possibility to exceed the threshold set by the operator). According to the present embodiment the small amount of resources correspond to a quantity less or equal to the difference between $\eta_{max\_RACH}$ (maximum resource threshold to ensure correct decoding of signalling channel) and $\eta_{max\_pl}$ (resource threshold set by the operator in the network planning phase).

Moreover it is possible to ensure lower percentage of rejected calls for the areas close to the base station, since these areas can benefit from the possibility to exceed the resource threshold set by the operator in the network planning phase.

In addition, thanks to the above embodiment, it is possible to differentiate the admission decision for different services on the basis of the estimated load increment due to a new call, by checking both the impact on the overall load and on the remaining resources.

A method and system for managing radio resources in mobile communication networks have thus been described herein that permit maximizing system capacity while ensuring the intended coverage. To that end the instant description discloses an integrated architecture for the admission control. Operation of that architecture is based on the introduction of a threshold parameter that can be set by the operator for each different type of service and that can assume different values for different load conditions. Such a threshold parameter indicates the percentage of remaining resources of the system that can be exploited.

Consequently, without prejudice to the underlying principles of the invention, the details and the embodiments may vary, also appreciably, with reference to what has been described by way of example only, without departing from the scope of the invention as defined by the annexed claims.

The above disclosed embodiment has been described with regard to exploiting power as the reference resource to monitor for maximizing capacity, however it is apparent for the man skilled in the art that different resources can be exploited, e.g. the cardinality of users determining the load.

The invention claimed is:

1. A method for controlling admission of calls to a mobile communication network having cells, wherein the mobile communication network includes a resource and at least one predetermined threshold load level of operation wherein exceeding said predetermined threshold load level results in cell coverage holes, the method comprising:

detecting a current load level value in uplink or downlink;

comparing the current load level value with said predetermined threshold load level; and admitting a call to said mobile communication network by allowing exceeding said predetermined threshold load level if after the admitting of the call, the mobile communication network is able to:

maintain existing calls already in progress; and detect new call requests coming from the coverage holes.

2. The method of claim 1, wherein the mobile communication network is able to detect new call requests when signaling channel decoding or random access channel decoding is ensured.

3. The method of claim 2, wherein said allowing exceeding said predetermined threshold load level comprises the step of:

determining at least one absolute threshold load level of operation which is higher than said predetermined threshold load level, said absolute threshold load level of operation permitting said signaling channel decoding or random access channel decoding.

4. The method of claim 3, further comprising the steps of:

determining a remaining resource of a cell defined by a difference between said at least one predetermined threshold load level of operation and said current load level value;

estimating a load increment required for the admission of said call to said mobile communication network; and
admitting said call to said mobile communication network if:
  i) said load increment added to said current load level value does not exceed said at least one predetermined threshold load level of operation; and
  ii) said load increment does not exceed a predetermined fraction of said remaining resource.

5. The method of claim 4, wherein said predetermined fraction of remaining resource of said cell is chosen by setting a corresponding parameter.

6. The method of claim 5, wherein said corresponding parameter is set for each different type of service that can be associated with said call.

7. The method of claim 3, further comprising the steps of:
determining a maximum remaining resource of a cell defined by a difference between said at least one absolute threshold load level of operation and said current load level value;
estimating a load increment required for the admission of said call to said mobile communication network; and
admitting said call to said mobile communication network if:
  i) said load increment added to said current load level value does not exceed said at least one absolute threshold load level of operation; and
  ii) said load increment does not exceed a predetermined fraction of said maximum remaining resource.

8. The method of claim 3, further comprising the step of:
terminating one of the existing call already in progress, if a new call request is received from an area where the service is guaranteed; or if it is not possible to maintain the existing calls already in progress.

9. The method of claim 8, wherein said operation of terminating said admitted call comprises forced termination of lower priority calls in progress or forced termination of the last accepted call.

10. The method of claim 4, wherein said current load level value is a function of a ratio of a measured receiver total wide band power and a thermal noise power of the system measured when the system does not carry traffic.

11. The method of claim 4, wherein said load increment is calculated as a function of a ratio of an average pilot symbol energy and a noise density of each channel.

12. The method of claim 4, wherein on the downlink, said load increment is calculated as a function of a user power for each single radio access bearer on the downlink.

13. The method of claim 12, wherein such a load increment for each kind of radio access bearer is calculated as a speech load increment multiplied by a power equivalent speech parameter.

14. The method of claim 1, further comprising obtaining information on the location of the calls with respect to the cell.

15. The method of claim 1, wherein said mobile communications network is a code division multiple access mobile network.

16. The method of claim 1, wherein said resource is power.

17. The method of claim 1, wherein said resource is the cardinality of the users.

18. A non-transitory computer-readable storage medium encoded with a computer program product loadable in the memory of at least one computer, the computer program product comprising software code portions capable of performing the steps of claim 1.

19. A system for controlling admission of calls to a mobile communication network having cells, wherein the mobile communication network includes a resource and at least one predetermined threshold load level of operation wherein exceeding said predetermined threshold load level results in cell coverage holes, comprising:
at least one network node for managing admission control including:
  a cell shrinking managing module configured to manage cell shrinking, wherein said cell shrinking managing module is further configured to allow exceeding said predetermined threshold load level when admitting a call to said mobile communication network, if after the admitting of the call, the mobile communication network is able to maintain existing calls already in progress and detect new call requests coming from the coverage holes.

20. The system of claim 19, wherein the mobile communication network is able to detect the new call requests when signaling channel decoding or random access channel decoding is ensured.

21. The system of claim 20, wherein said at least one network node is configured to allow exceeding said predetermined threshold load level by determining at least one absolute threshold load level of operation which is higher than said predetermined threshold load level, said absolute threshold level of operation permitting said signaling channel decoding or random access channel decoding.

22. The system of claim 21, wherein said network node further comprises a threshold setting module configured to:
determine at least one current resource level in uplink and/or downlink representative of current operation of said mobile communication network before admission of said call, wherein the difference between said at least one predetermined threshold load level and said at least one current resource level defines a remaining resource of a cell;
estimating a resource increment required for the admission of said call to said mobile communication network; and
admitting said call to said mobile communication network if:
  i) said resource increment added to said at least one current resource level does not exceed said at least one threshold level of operation; and
  ii) said resource increment does not exceed a predetermined fraction of said remaining resource.

23. The system of claim 22, wherein said predetermined fraction of remaining resource of said cell is chosen by setting a corresponding parameter in said threshold setting module.

24. The system of claim 23, wherein said network node is configured to set a corresponding parameter for each different type of service that can be associated with said call.

25. The system of claim 22, wherein said threshold setting module is configured to obtain said current resource level by a function of the ratio of a measured receiver total wide band power and a thermal noise power of the system measured when the system does not carry traffic.

26. The system of claim 22, wherein said threshold setting module is configured to calculate said power increment in the uplink as a function of the ratio of an average pilot symbol energy and a noise density of each channel.

27. The system of claim 22, wherein said threshold setting module is configured to calculate on the downlink said power increment as a function of a user power for each single radio access bearer on the downlink.

28. The system of claim 21, wherein said at least one network node comprises a threshold setting module configured to:

determine at least one current resource level in uplink and/or downlink representative of current operation of said mobile communication network before admission of said call, wherein the difference between said absolute threshold level of operation and said at least one current resource level defines a maximum remaining resource of a cell;

estimating a resource increment required for the admission of said call to said mobile communication network; and admitting said call to said mobile communication network if:

i) said resource increment added to said at least one current resource level does not exceed said at least one absolute threshold level of operation; and ii) said resource increment does not exceed a predetermined fraction of said maximum remaining resource.

29. The system of claim 19, wherein said cell shrinking managing module is configured to terminate one of the existing calls, if a new call request is received from an area where the service is guaranteed, or if it is not possible to maintain the existing calls already in progress.

30. The system of claim 29, wherein said cell shrinking managing module is configured to terminate said admitted call by forced termination of lower priority calls in progress or forced termination of the last accepted call.

31. The system of claim 19, wherein said cell shrinking managing module is configured to obtain information on the location of mobile terminals with respect to base stations.

32. The system of claim 19, wherein said mobile communications network is a code division multiple access mobile network.

33. The system of claim 19, wherein said resource is power.

34. The system of claim 19, wherein said resource is the cardinality of the users.

35. A telecommunication network comprising a system according to claim 19.

36. A method for admitting a new call in a mobile communication network having a predetermined threshold load level and a predetermined cell coverage area, comprising the steps of:

detecting a current load level value;

comparing the current load level value with said predetermined threshold load level; and admitting the new call to said mobile communication network by allowing exceeding said predetermined threshold level, if after the admitting of the call, the mobile communication network is able to maintain existing calls already in progress and to detect new call requests coming from the predetermined cell coverage area.

* * * * *